United States Patent
Tanner et al.

(10) Patent No.: US 11,288,441 B1
(45) Date of Patent: Mar. 29, 2022

(54) SYSTEM AND METHOD FOR CREATION AND MANAGEMENT OF PUBLIC LINKS IN A PUBLIC LINK DASHBOARD FOR PUBLIC SAFETY AGENCIES

(71) Applicant: MOTOROLA SOLUTIONS, INC., Chicago, IL (US)

(72) Inventors: Kylene Tanner, Boutiful, UT (US); John C Yager, Oak Park, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/448,358

(22) Filed: Sep. 22, 2021

(51) Int. Cl.
*G06F 40/134* (2020.01)
*G06Q 50/26* (2012.01)
*G06F 3/0484* (2022.01)
*G06F 3/0482* (2013.01)

(52) U.S. Cl.
CPC .......... *G06F 40/134* (2020.01); *G06F 3/0482* (2013.01); *G06F 3/0484* (2013.01); *G06Q 50/26* (2013.01)

(58) Field of Classification Search
CPC .............................. G06F 40/134; G06Q 50/26
See application file for complete search history.

(56) References Cited

U.S. PATENT DOCUMENTS

| | | | |
|---|---|---|---|
| 10,091,313 B2 | 10/2018 | Nuzzi | |
| 10,320,633 B1 | 6/2019 | Wong et al. | |
| 2003/0023476 A1* | 1/2003 | Gainey | G06Q 10/06398 705/7.42 |
| 2013/0346440 A1* | 12/2013 | Alon | G06Q 50/265 707/769 |
| 2015/0381667 A1* | 12/2015 | Brewer | H04W 4/00 709/204 |
| 2017/0055138 A1* | 2/2017 | McDonnell | H04W 4/90 |
| 2018/0350225 A1* | 12/2018 | Siminoff | H04N 7/186 |
| 2019/0304042 A1* | 10/2019 | Santell | G06Q 50/26 |
| 2019/0370400 A1* | 12/2019 | Nadeau | H04L 63/166 |
| 2019/0372946 A1* | 12/2019 | Nadeau | H04L 9/0894 |
| 2020/0327177 A1 | 10/2020 | Schenk | |
| 2021/0158047 A1* | 5/2021 | Tanner | G06V 20/46 |

* cited by examiner

*Primary Examiner* — Asher D Kells

(57) ABSTRACT

Techniques for management of links related to public safety incidents within a window displayed in a graphical user interface are provided. Creation of a plurality of links associated with public safety incidents is monitored. When each of the links is shared is monitored. With whom each of the links is shared is monitored. The graphical user interface displays a list of the created links, the links created by an agency. User input selecting a created link from the list of created links is received. The graphical user interface, details about the link creation, the details including when the link that was created, the expiration date of the link, whom the link was shared with, and when the link was shared. The graphical user interface displays a control to alter the expiration date of the link, wherein a notification of media upload routed based, in part, on the expiration date.

20 Claims, 9 Drawing Sheets

| LinkManager | | | | ● Doe, John ▶ |
|---|---|---|---|---|
| Public links | 🔍 — 215 | | | New link — 200 |
| Case number — 210 | Link: All ▶ — 220 | Description — 225 | Status: All ▶ — 230 / 235 | Expiration |
| HRZ85MRN4AG | Evidence | his seven-layer cake only had six layers. | Active | 2021-06-30 |
| AYL45FDL9PC | Statement | The small white buoys marked the location of hundreds of crab pots. | Active | 2021-06-30 |
| BJMO1GDC8BL | Agency page | I come from a tribe of head-hunters, so I wilt never need a shrink. | Expired | 2021-06-30 |
| | Tip | They called out her name time and again, but were met with nothing. | Active | 2021-06-30 |
| | Non-emergency call | She was amazed by the large chunks of ice washing up on the beach. | Active | 2021-06-30 |
| MBH35BFB9L | Police report | She finally understood that grief was her love with no place for it to go. | Expired | 2021-06-30 |
| OSZO1HRE4Q0 | Public records request | It's much more difficult to play tennis with a bowling ball than it is to bowl. | Active | 2021-06-30 — 245 |
| RZS74CMM4ZF | SMS/MMS | Nobody questions who built the pyramids in Mexico. | Active | 2021-06-30 — 250 |
| — 240 Evidence | | While all her friends were positive that Mary had a sixth sense. | Active | 2021-06-30 |
| JNU1OVLF7Z1 | Evidence | 100 years old is such a young age if you happen to be a bristlecone pine. | Active | 2021-06-30 |

505 — PROVIDE A LINK CREATION CONTROL WITHIN THE GRAPHICAL USER INTERFACE

510 — IN RESPONSE TO ACTIVATION OF THE LINK CREATION CONTROL TO CREATE A LINK, PROVIDE AT LEAST ONE POP-UP WINDOW WHEREIN THE USER INPUTS AT LEAST ONE OF

- 515 — A CASE IDENTIFIER
- 520 — A LINK TYPE

525 — CREATE THE LINK

530 — ADD THE INCIDENT RELATED LINK TO THE LIST OF CREATED LINKS

535 — RECEIVE, VIA THE GRAPHICAL USER INTERFACE, AN IDENTIFICATION OF DESIGNATED USER TO BE NOTIFIED WHEN MEDIA IS UPLOADED USING A LINK WHOSE STATUS IS EXPIRED

540 — ASSOCIATE, VIA THE GRAPHICAL USER INTERFACE, A CATEGORY WITH EACH CREATED LINK, WHEREIN THE CATEGORY ASSOCIATED WITH A LINK IS INDICATIVE OF A LEVEL OF TRUST OF MEDIA UPLOADED USING THE CREATED LINK

*FIG. 5*

SYSTEM AND METHOD FOR CREATION AND MANAGEMENT OF PUBLIC LINKS IN A PUBLIC LINK DASHBOARD FOR PUBLIC SAFETY AGENCIES

BACKGROUND

One of the most common tasks in a public safety environment is gathering information and evidence. For example, in the case of law enforcement agency investigating a crime incident, a police officer may question witnesses to the crime to help determine what occurred. There may also by physical evidence (e.g. spent shell casings, fingerprints, DNA, etc.) that is gathered. All of the gathered information and evidence may then be associated with the incident.

An always increasing type of information is electronic in nature. The presence of smartphones with cameras capable of recording audio and video has become ubiquitous. There is also an ever increasing number of both public and private surveillance cameras. The media generated by these types of devices are stored as a computer file. A public safety agent may obtain the file by downloading it from the source device, requesting the user send the file (e.g. via email, etc.), copying the file onto a storage device (e.g. USB memory stick, etc.), etc. The electronic files may then be associated with the incident.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIGS. 1(A-D) depict an example user interface that may be used to create links that are distributed to the public.

FIG. 2 is an example of a public link dashboard for management of public links for public safety agencies.

FIG. 3 is an example of a created link details page.

FIG. 5 is an example of a high level flow diagram for the process of link creation.

Figure 4:
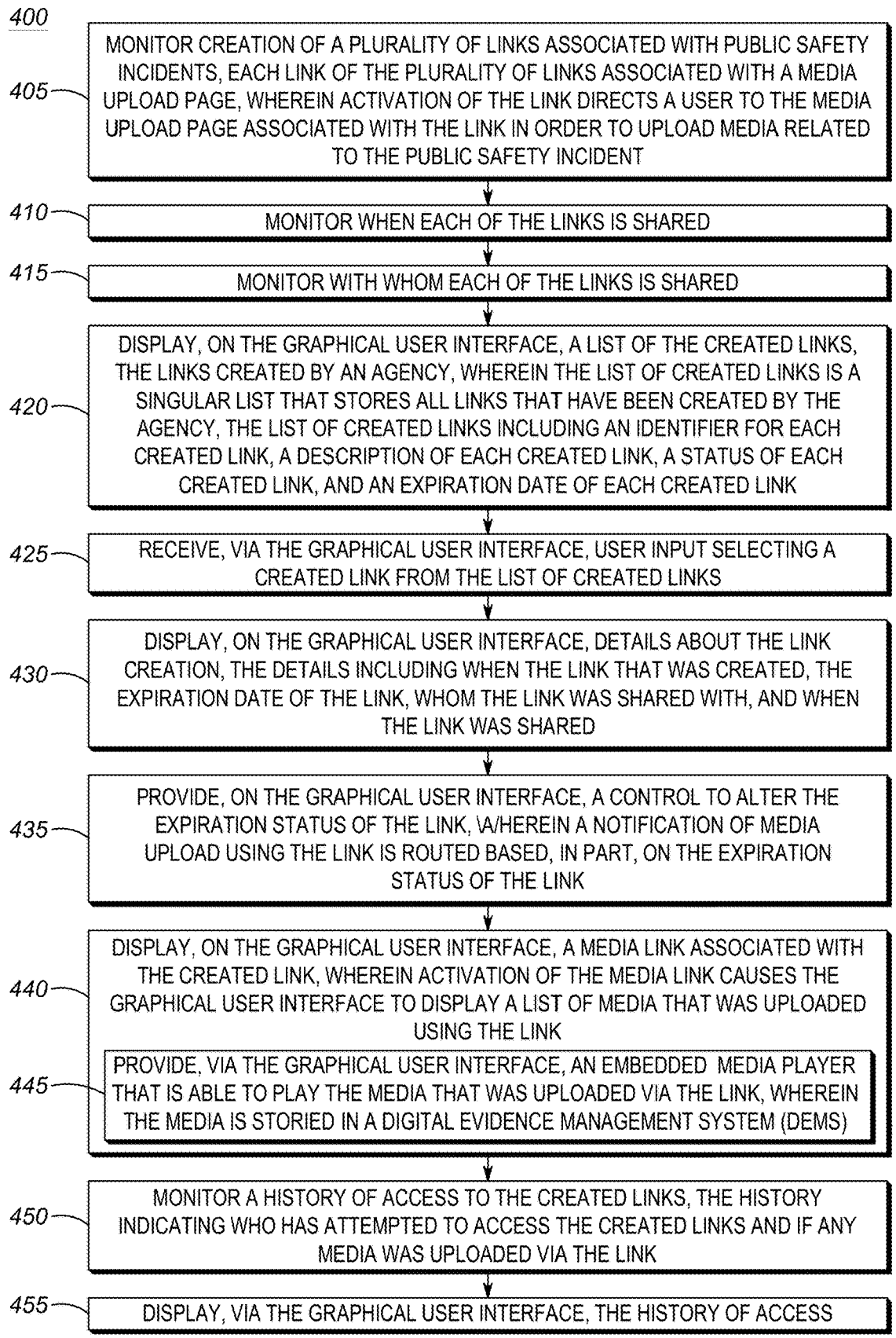
FIG. 4 is an example of a high level flow diagram for management of links related to public safety incidents within a window displayed in a graphical user interface.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Although the general idea of gathering electronic information from the source of the information seems straightforward, a problem arises in that keeping track of what electronic information, which can also be referred to as media, has been requested, from whom it has been requested, when it was requested, and what incident/case it is related to, becomes extraordinarily complex. The media may be received by any number of public safety agents (e.g. multiple officers working on an incident, etc.), via multiple transfer paths (e.g. via email, via text message, downloaded to a USB memory stick, etc.).

This problem is further exacerbated as a public safety agency gets larger. For example, in a major city, it is likely the public safety agency will be working on hundreds, if not thousands of incidents at the same time. Keeping track of all the requests for media becomes a task that is infeasible to manage manually, without the assistance of computing resources. The problem can also be made worse when individual public safety officers are working on multiple incidents simultaneously and may use multiple different ways to receive media.

The techniques described herein overcome these problems, individually and collectively. The system provides a link creation tool that allows a public safety agency user to generate a distributable link (e.g. URL, QR code, etc.) when requesting media from external sources. When the link is activated (e.g. URL is clicked, QR code is scanned, etc.), the external media source is directed to a media upload landing page that is specifically associated with the media request for which the link was created. The external media source may upload media via the media upload page. The uploaded media is thus associated with the created link. This avoids the problem of media being provided through many disparate sources (e.g. email, USB memory stick, etc.), as all media that is uploaded will be through the link created for the media request.

The link creation tool will further allow the public safety agency user to input information about the media request itself. For example, whom the media is being requested from, when it is being requested, if there is an identifier associated with the request (e.g. incident ID, case number, etc.). The link creation tool may further provide the ability to directly send the link to external media sources via email or text message, along with a description of the reason for the media request.

In addition to the link creation tool, the system also provides a public link management dashboard that displays a list of all the links that have been created and the status of those links, including if the link is active or expired. The public link management dashboard is a singular interface that includes all links that were created by anyone in the public safety agency, thus providing a single source of truth for all media requests that have been sent by the agency. A public safety agency user is able to click on a specific item in the dashboard and will be sent to a link details page to obtain more information about the link.

The link details page includes information about the created link. The information can include when and why the link was created, a description of the media request, to whom the request was sent and when it was sent. The link details page may also include the link itself (e.g. URL, QR code, etc.) which the public safety agency user may then use to send additional requests for media to external media sources. The link details page may also include a control that allows the user to change the expiration date of the link.

A computer-implemented method for management of links related to public safety incidents within a window displayed in a graphical user interface is provided. The method includes monitoring creation of a plurality of links associated with public safety incidents, each link of the plurality of links associated with a media upload page, wherein activation of the link directs a user to the media upload page associated with the link in order to upload media related to the public safety incident. The method also includes monitoring when each of the links is shared. The method also includes monitoring with whom each of the links is shared.

The method also includes displaying, on the graphical user interface, a list of the created links, the links created by an agency, wherein the list of created links is a singular list that stores all links that have been created by the agency, the list of created links including an identifier for each created link, a description of each created link, a status of each created link, and an expiration date of each created link. The method also includes receiving, via the graphical user interface, user input selecting a created link from the list of created links.

The method also includes displaying, on the graphical user interface, details about the link creation, the details including when the link that was created, the expiration date of the link, whom the link was shared with, and when the link was shared. The method also includes providing, on the graphical user interface, a control to alter the expiration date of the link, wherein a notification of media upload using the link is routed based, in part, on the expiration date of the link.

In one aspect, the method includes providing a link creation control within the graphical user interface and in response to activation of the link creation control to create a link, providing at least one pop-up window wherein the user inputs at least one of a case identifier and a link type, creating the link, and adding the created link to the list of created links. In one aspect, the method includes displaying, on the graphical user interface, a media link associated with the created link, wherein activation of the media link causes the graphical user interface to display a list of media that was uploaded using the link.

In one aspect, the method includes providing, via the graphical user interface, an embedded media player that is able to play the media that was uploaded via the link, wherein the media is stored in a digital evidence management system (DEMS). In one aspect, the method includes receiving, via the graphical user interface, an identification of designated user to be notified when media is uploaded using a link whose status is expired.

In one aspect, the method includes associating, via the graphical user interface, a category with each created link, wherein the category associated with a link is indicative of a level of trust of media uploaded using the created link. In one aspect, the method includes monitoring a history of access to the created links, the history indicating who has attempted to access the created links and if any media was uploaded via the link and displaying, via the graphical user interface, the history of access.

A computing device to implement management of links related to public safety incidents within a window displayed in a graphical user interface is provided. The device comprises a processor and a memory coupled to the processor, the memory containing a set of instructions thereon. The instructions, that when executed by the processor cause the processor to monitor creation of a plurality of links associated with public safety incidents, each link of the plurality of links associated with a media upload page, wherein activation of the link directs a user to the media upload page associated with the link in order to upload media related to the public safety incident. The instructions further cause the processor to monitor when each of the links is shared. The instructions further cause the processor to monitor with whom each of the links is shared.

The instructions further cause the processor to display, on the graphical user interface, a list of the created links, the links created by an agency, wherein the list of created links is a singular list that stores all links that have been created by the agency, the list of created links including an identifier for each created link, a description of each created link, a status of each created link, and an expiration date of each created link. The instructions further cause the processor to receive, via the graphical user interface, user input selecting a created link from the list of created links.

The instructions further cause the processor to display, on the graphical user interface, details about the link creation, the details including when the link that was created, the expiration date of the link, whom the link was shared with, and when the link was shared. The instructions further cause the processor to provide, on the graphical user interface, a control to alter the expiration date of the link, wherein a notification of media upload using the link is routed based, in part, on the expiration date of the link.

In one aspect, the instructions further cause the processor to provide a link creation control within the graphical user interface and in response to activation of the link creation control to create a link, provide at least one pop-up window wherein the user inputs at least one of a case identifier and a link type, create the link, and add the created link to the list of created links. In one aspect, the instructions further cause the processor to display, on the graphical user interface, a media link associated with the created link, wherein activation of the media link causes the graphical user interface to display a list of media that was uploaded using the link.

In one aspect, the instructions further cause the processor to provide, via the graphical user interface, an embedded media player that is able to play the media that was uploaded via the link, wherein the media is stored in a digital evidence management system (DEMS). In one aspect, the instructions further cause the processor to receive, via the graphical user interface, an identification of designated user to be notified when media is uploaded using a link whose status is expired.

In one aspect, the instructions further cause the processor to associate, via the graphical user interface, a category with each created link, wherein the category associated with a link is indicative of a level of trust of media uploaded using the created link. In one aspect, the instructions further cause the processor to monitor a history of access to the created links, the history indicating who has attempted to access the created links and if any media was uploaded via the link and display, via the graphical user interface, the history of access.

A non-transitory processor readable medium containing a set of instructions thereon is provided. The instructions, that when executed by the processor cause the processor to implement management of links related to public safety incidents within a window displayed in a graphical user interface. The medium comprising instructions that when executed cause the processor to monitor creation of a plurality of links associated with public safety incidents, each link of the plurality of links associated with a media upload page, wherein activation of the link directs a user to the media upload page associated with the link in order to upload media related to the public safety incident. The medium further comprising instructions that cause the processor to monitor when each of the links is shared. The medium further comprising instructions that cause the processor to monitor with whom each of the links is shared.

The medium further comprising instructions that cause the processor to display, on the graphical user interface, a list of the created links, the links created by an agency, wherein the list of created links is a singular list that stores all links that have been created by the agency, the list of created links including an identifier for each created link, a description of each created link, a status of each created link. The medium further comprising instructions that cause the processor to receive, via the graphical user interface, user input selecting a created link from the list of created links.

The medium further comprising instructions that cause the processor to display, on the graphical user interface, details about the link creation, the details including when the link that was created, the expiration date of the link, whom the link was shared with, and when the link was shared. The medium further comprising instructions that cause the processor to provide, on the graphical user interface, a control to alter the expiration date of the link, wherein a notification of media upload using the link is routed based, in part, on the expiration date of the link.

In one aspect, the medium further comprises instructions that cause the processor to provide a link creation control within the graphical user interface and in response to activation of the link creation control to create a link, provide at least one pop-up window wherein the user inputs at least one of an case identifier and a link type, create the link, and add the created link to the list of created links.

In one aspect, the medium further comprises instructions that cause the processor to display, on the graphical user interface, a media link associated with the created link, wherein activation of the media link causes the graphical user interface to display a list of media that was uploaded using the link. In one aspect, the medium further comprises instructions that cause the processor to receive, via the graphical user interface, an identification of designated user to be notified when media is uploaded using a link whose status is expired.

In one aspect, the medium further comprises instructions that cause the processor to associate, via the graphical user interface, a category with each created link, wherein the category associated with a link is indicative of a level of trust of media uploaded using the created link. In one aspect, the medium further comprising instructions that cause the processor to monitor a history of access to the created links, the history indicating who has attempted to access the created links and if any media was uploaded via the link and display, via the graphical user interface, the history of access.

Further advantages and features consistent with this disclosure will be set forth in the following detailed description, with reference to the figures.

Figure 1A:
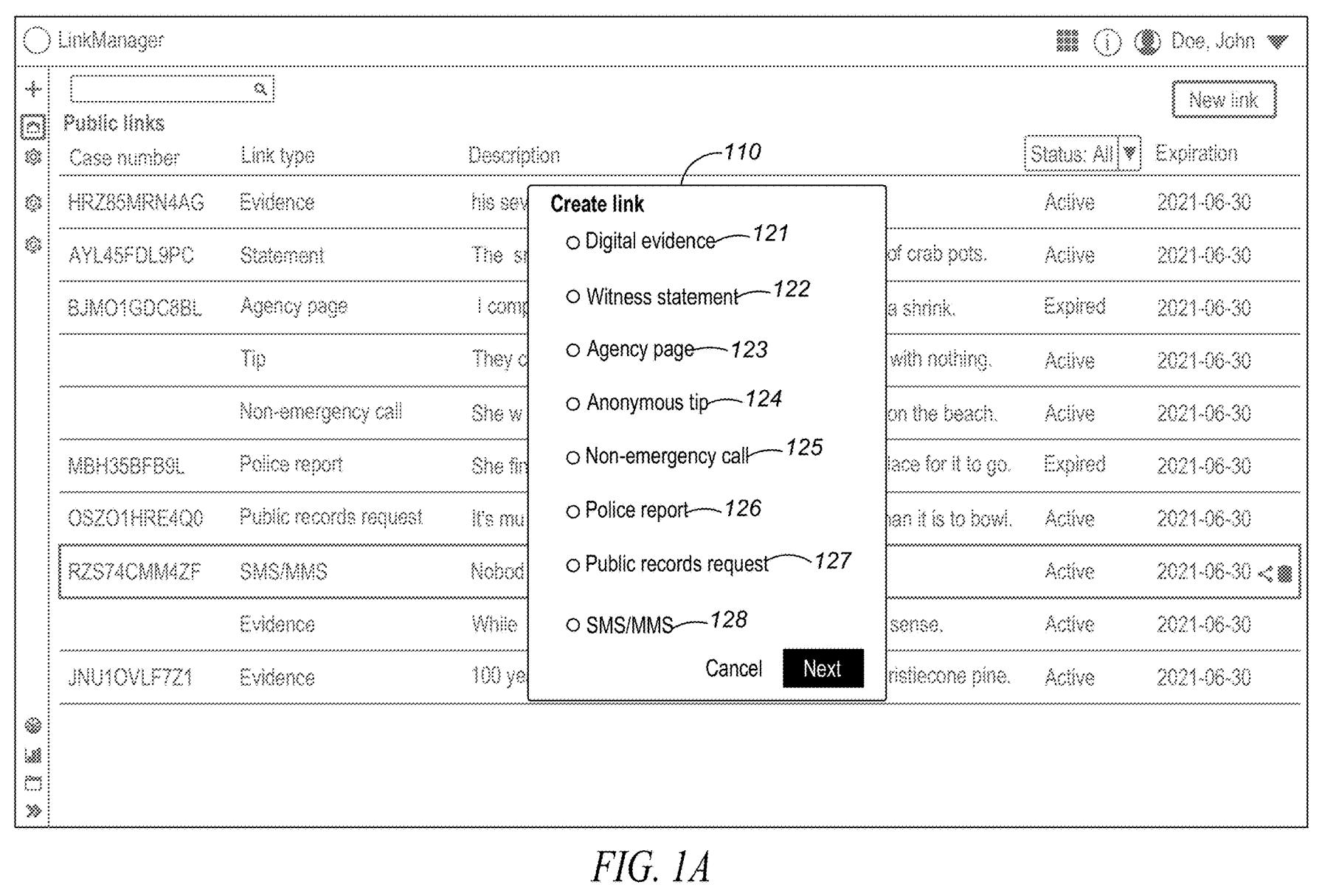

FIGS. 1(A-D) depict an example user interface that may be used to create links that are distributed to the public. An element, such as a clickable button, may be provided on the user interface to allow a user to create a new link that may be distributed to the public in order to receive uploaded information, such as media files and other such information. When activated, a series of pop-up windows, as described in FIGS. 1(A-D) may be presented to the public safety agency user in order to gather the details necessary to create the link.

FIG. 1A depicts a pop-up dialog box 110 that allows the user to identify the type of link that is being created, as there may be different links created for different types of requests. The user may select which type of link they wish to create. Some example link types are described below. However, it should be understood that these examples are not intended to be an exhaustive list. The techniques described herein are applicable to any later created link type.

The user may select the Digital Evidence 121 link type when the link that is being created is to be used to request an upload of digital evidence from an external source. For example, a member of the public may have media files stored on their smartphone and the public safety agency may desire a copy of those files to be used as evidence. Selecting a digital evidence link may cause the link to be associated with a media upload landing page.

Another type on link that may be created is a Witness Statement 122 link. Such a link may cause a user to be directed to a landing page where a user may provide a statement as to what knowledge they have about the incident that is under investigation. The witness statement link may cause the user to be directed to a page where evidence can be uploaded, as well as an area to provide the witnesses comments on the incident.

Yet another type of link that may be created is an Agency Page 123 link which may direct a user to a website that is associated with the public safety agency. In other words, it could be a link to direct the user to the public website of the agency that is creating the link, in order to provide information about the agency.

Yet another link type that may be created is an Anonymous Tip 124 link which may allow the user to submit an anonymous tip, possibly including uploaded media, to the public safety agency. As will be explained in further detail below, the anonymous tip link may be useful when it is desired to send a link to the public in general, as opposed to specific, known, individuals.

Yet another link type that may be created is a Non-Emergency Call 125 link. In some cases, a public safety agency may desire information from the public that is not of an emergency nature. A non-emergency link may allow the upload of media and other information that does not have a sense of urgency.

Yet another link type that may be created is a Police Report 126 link. A police report link may direct a user to a page where they may enter information that would be needed in a police report. For example, instead of a law enforcement officer handing out a paper police report to be filled out by a victim of a crime, the link may be provided. The victim would then go to the page specified by the link and fill in the police report online.

Yet another link type that may be created is a Public Records Request 127 link. A public records request link may be used when it is desired to collect publicly available information.

Yet another type of link is a short message service (SMS) link 128. As explained above, the evidence link may direct a user's web browser to a media upload web page where media may be uploaded. An SMS link may instead cause the messaging application on the user's smartphone to launch and begin the process of sending an SMS message to the number included in the link. Although a SMS message is mentioned, it should be understood that the techniques are not limited to SMS. Multimedia Message Service (MMS) could also be used. What should be understood is that regardless of the messaging type, a messaging application is launched to send a message including the desired information. It should be further understood that although the remainder of the description is described in terms of a link that directs the user to a web based media upload page, the same techniques would be applicable to uploading information via a messaging application.

Once the user has selected the type of link that is to be created, they may be given the option to cancel link creation, or to move to the next step in the process.

Figure 1B:
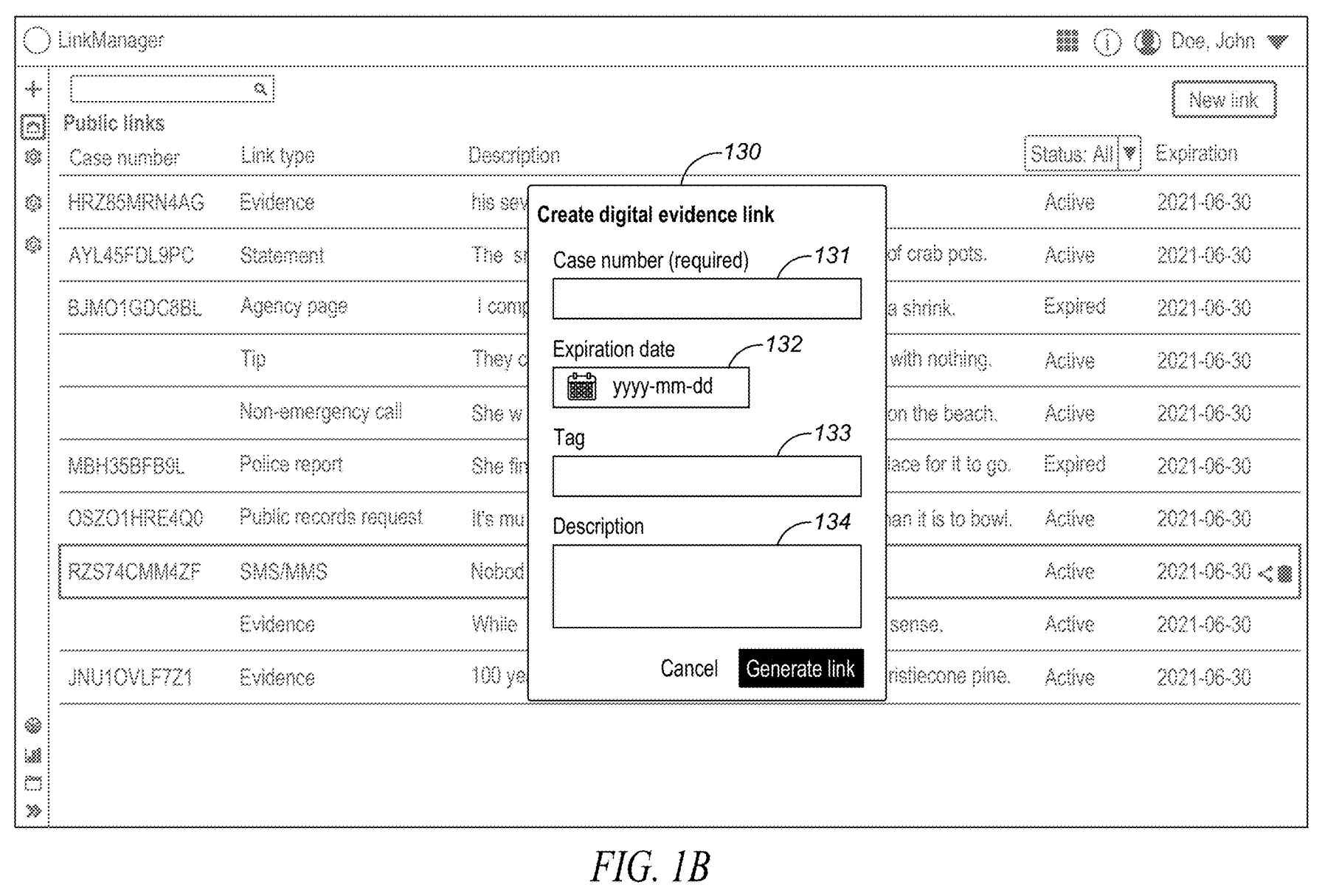

FIG. 1B is a pop-up dialog box 130 that allows the user to enter details as to why the link is being created. For purposes of ease of description, the remainder of the figures will be described assuming that the link type that is being created is a digital evidence link. However, it should be understood that the techniques described are generally applicable to any type of link that is created.

The evidence link may be associated with a case number (e.g. incident identifier, etc.). Generally, when a public safety agency is requesting digital evidence it is in connection with an incident that is being investigated. The user interface includes a case number input box 131, where the public safety user can enter the case number of the case that is related to the link being created.

The user interface may also include an expiration date 132 that may be entered by the public safety user. In some cases, the public safety agency may wish to set a timeframe for use of the link. For example, assume that a crime has occurred and the public safety agency wishes to solicit any media (e.g. smartphone video, etc.) captured by the public. The link may be created and then sent to the public generally. For example, a social media post may be created asking the public for their assistance in providing the media. The link can be included in the social media post, which would further instruct readers who have media to upload to click on the link. Users who click on the link will be directed to a media upload page that is associated with the link.

However, at some point, the public safety agency may no longer wish to obtain new media files. For example, the passage of time may make later received media not very valuable. The expiration date may be set such that after the link is expired, no new media is allowed to be uploaded using that link. As will be explained in further detail below, special processing may occur when it is determined that someone is attempting to upload media using an expired link.

The user interface may also include the ability to add a tag 133 to the link. The tag filed may be utilized to perform searches. For example, a tag could be an identifier related to a certain incident type (e.g. assault, etc.). A search could be performed on that tag and the search would return all links that were created that included the tag.

The user interface may also include a description field 134 where the public safety agency user may enter a description for the link. The description could include details about the incident that is associated with the link, reasons why the link is being created, information that is hoped to be obtained via the link, or any other information the public safety agency deems would be useful to store in association with the link. Once the user has entered this information, they are given the option to cancel link generation or to generate the link.

Figure 1C:
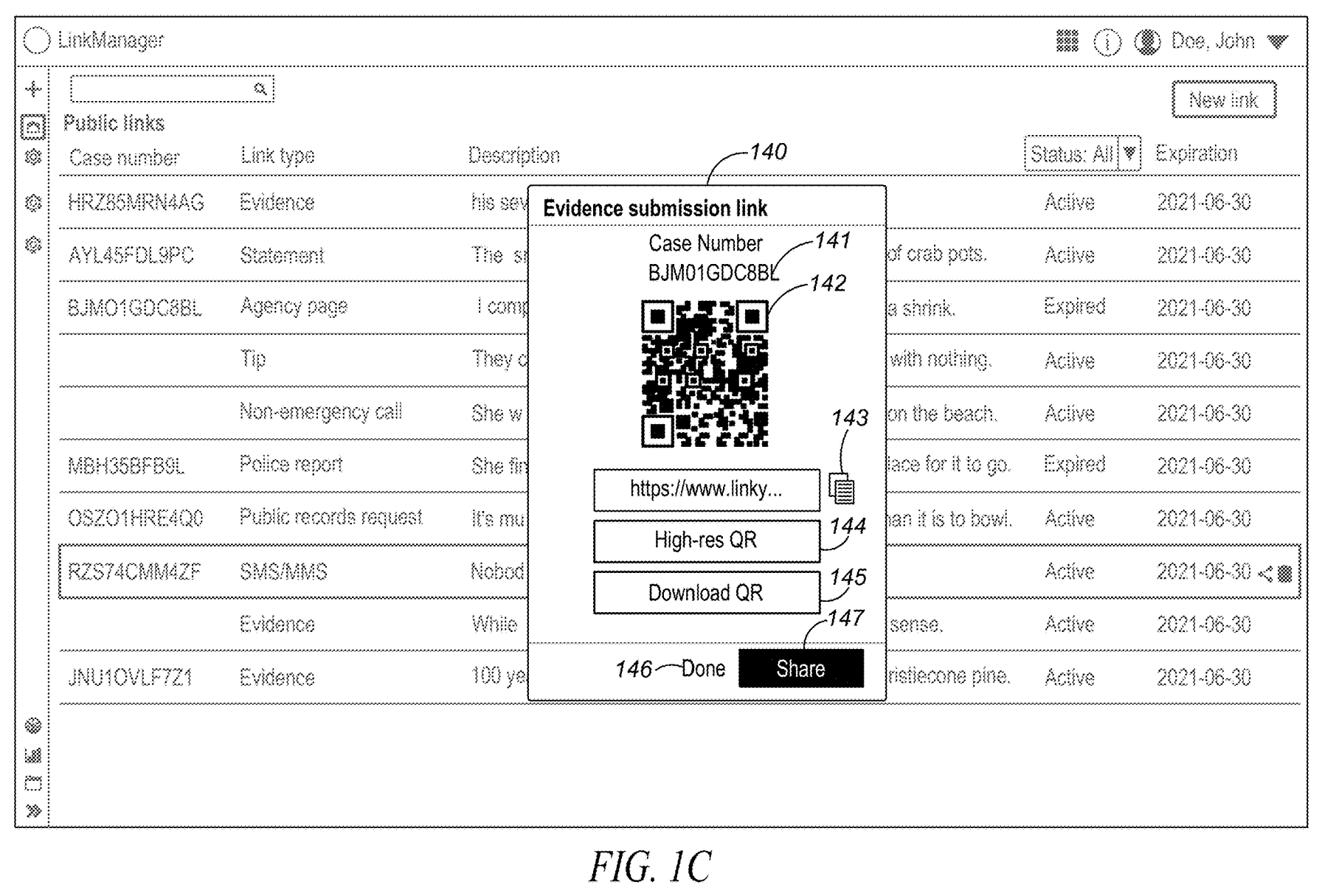

FIG. 1C depicts the created link in a pop-up window 140. As shown, the link may include the case number 141 that had been entered as part of link creation. The link may include a QR code 142. When the QR code is scanned with a device such as a smartphone, the user is directed to a web page. In the case of an evidence submission link, the user may be directed to a media upload landing page where he may upload media.

The created link pop-up window may also include the link in the form of a URL 143. The QR code may, in fact, simply be the URL encoded as a QR code. The URL can be provided to a device that may not have access to a QR scanner. For example, the URL may be included in an email that is read using a desktop or laptop computer, wherein a camera for QR code scanning may not be readily available.

The created link pop-up window may also include an option to present a high resolution QR code 144. In some cases, such as when including a QR code on a piece of printed media, it is desirable to have a high resolution version of the QR code. The user may be given the option to download the QR code 145. The downloaded QR code could be included in an e-mail or some other form of communication, as will be described in further detail below. The user may then indicate that they are done 146 with the link creation tool or given the option to share 147 the link, which will be described in further detail with respect to FIG. 1D.

In one mode of operation, the created link pop-up window itself may be used to share the link. For example, consider a use case where a law enforcement officer is interviewing a witness to a fight. The witness may state that they captured video of the fight on their smartphone. The officer may access the link creation tool via his own device (e.g. smartphone, radio, etc.) and create the link for evidence submission as described with respect to FIGS. 1(A-C). Once the link creation pop-up 140 appears, the officer may hold up his device so that the QR code can be scanned by the witness. The witness may then be directed to the media upload page to upload captured fight video.

Figure 1D:
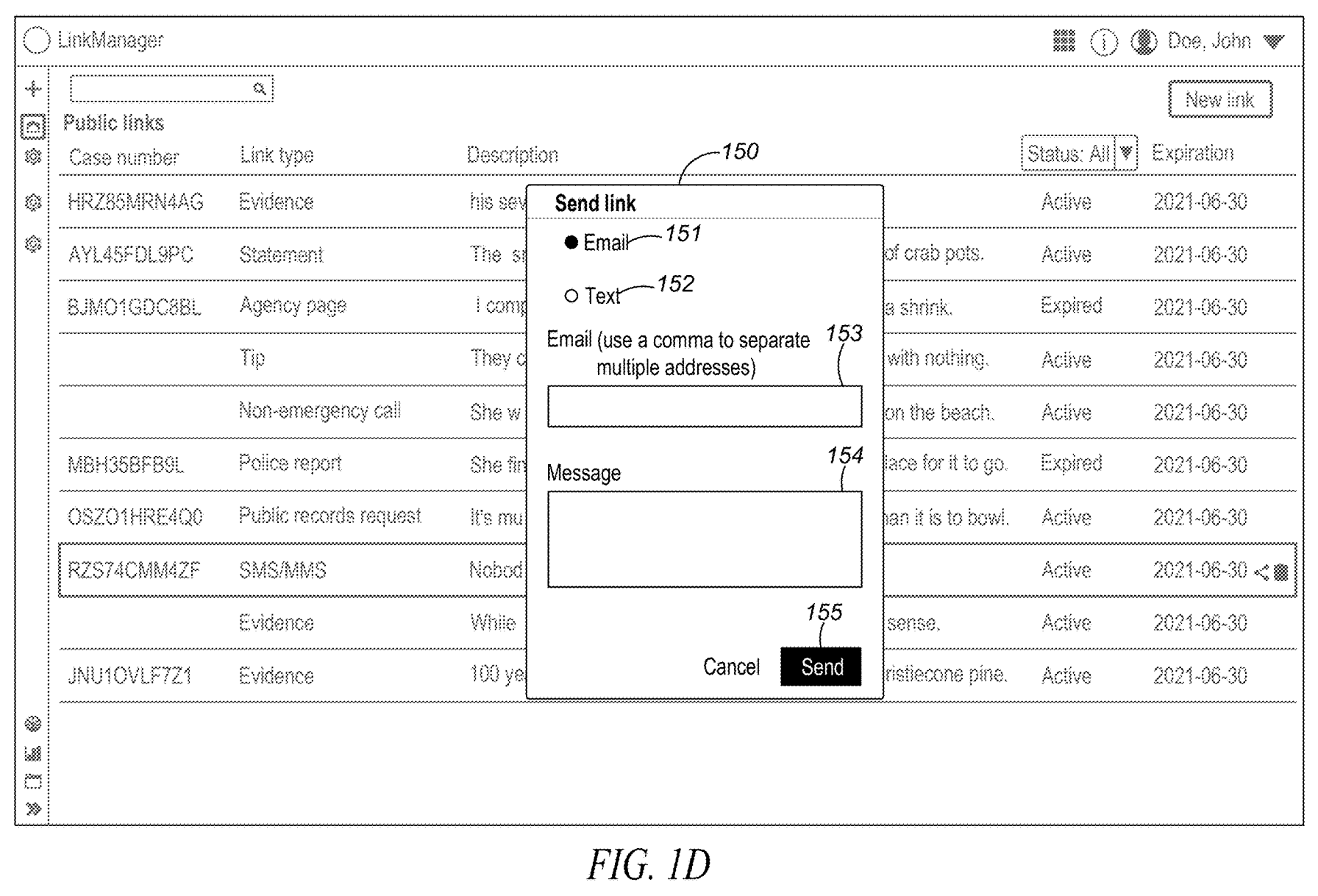

FIG. 1D depicts a share link pop-up window 150. The user is given an option to share the link via email 151 or text message 152. It should be understood that these two mechanisms are simply examples of techniques that may be used to share the link. Other techniques could include sharing via a specific application, sharing to social media, etc.

The user is given the option to enter one or more email addresses 153. In the case of a text message, the user would be given the option to enter one or more phone numbers. The user may also be given the option to include a message 154 along with the link. The message may be used, for example, to describe why the link is being sent or to provide further information on the media that is being requested. The user is then given the option to send 155 the link. Although not shown, the user may also be given the option to attach one or more files to the email that is being sent. Use of such an attachment is described below.

Consider a case where there was an incident, such as an assault, in the vicinity of a casino. Such an area would be known to be well covered by security cameras and that the casino would be staffed with professional security staff. Typically, the casino security staff may be willing to provide any available video footage upon receipt of a subpoena. Utilizing the link creation techniques described herein, the investigating officer may create a link for evidence submission as described above. The officer may then include, in the message portion of the email, the media that is desired (e.g. all video of north entrance from 10 PM-11 PM on Sep. 1, 2021, etc.). The officer may then obtain and attach the subpoena to the email.

Upon receipt of the email, the casino security staff can review the subpoena, and upon determining it is valid, retrieve the requested media. The staff can activate the link (e.g. click, scan, etc.) to be taken to the media upload page for that link, and upload the requested video.

The above description of link creation has referred to a media upload page associated with the link. It should be understood that each media upload page is associated with a media storage platform, such as a digital evidence management system (DEMS), that in addition to storing media files, is also able to track chain of custody for those files. Tracking chain of custody may include tracking who has accessed, viewed, copied, etc. the media files. Because the upload pages are associated with a specific link, it can be determined, for each media file uploaded, which link was used to upload the file. In turn, that allows association with a link details page, which will be described in further detail below.

FIG. 2 is an example of a public link dashboard for management of public links for public safety agencies. As described above, link creation is a generally easy process that allows for collection of media from the public in a convenient way. However, the number of links that can be created can quickly overwhelm public safety agency staff. Furthermore, since many different people within the public safety agency may create links, it would be infeasible for each person to keep track of not only the links they have created, but also all links created by any other staff members within the public safety agency.

The techniques described herein overcome this problem by providing a public link dashboard. The dashboard may include all links created by anyone in the agency. The high level status of those links can be reviewed at a glance. If further details are needed, the user can click on an item in the list of links, and be taken to a page that has further details related to the link creation.

FIG. 2 depicts a user interface 200 that acts as a dashboard for all created links. The user may be provided a control on the dashboard to create a new link 205. Activating the new link control may cause the series of pop-up windows described with respect to FIGS. 1(A-D) to be presented. In some implementations, a new link may only be created from the user interface 200, thus ensuring that the system is always made aware when a new link is created. In other implementations, the link may be created external to the dashboard, but the dashboard is able to access a list of all links that have been created.

The dashboard 200 may contain a list of all links that have been created. The list may include a case number 210, if available. As described with respect to FIG. 1B, the majority of the time a link is generated, it will be associated with some type of incident identifier, such as a case number. The dashboard may display a case number and the list may be sorted by the case number. As such, identifying all the links that have been created for a particular case number would be a simple matter of sorting by that case number.

The dashboard 200 also includes search functionality 215 that would allow a user to search the list of created links by entering a case number. All links associated with that case number could then be retrieved and displayed. The dashboard 200 may also include a type of link that was created. As explained with respect to FIG. 1A there may be many different types of links (e.g. evidence submission, witness statement, etc.). The dashboard may provide the ability to filter the list of created links by link type. In the example shown, there is a drop down box 220 where the user can select a particular link type. By selecting a specific link type, the list of created links may be filtered to only show the links of the selected type. Thus for example, if a user is looking for evidence submission link types, they can select that link type from the drop down box.

It should further be understood that the link type selection drop down box 220 may be combined with search results from the search box 215. For example, the user may first search for a specific case number, which would filter the list to include only links created that are associated with that specific case number. The drop down box may then be used to select only a specific type of link. The overall results may then be further filtered, such that only results from the specified cases number, of the selected link type, are displayed in the list of created links.

The dashboard 200 may further include a description 225 for each created link. The description, in some cases, may be a human readable description of why the link was created. The description may have been generated when the public safety agency user created the link, such as via the process described with respect to FIG. 1B.

The dashboard 200 may further include a link status 230 which provides a status for each created link. In an implementation, the link status can either be active or expired. The link status field 230 may include a drop down box that allows a user to select a link status. The list of created links may be filtered to include only created links of the selected status. For example, if the user selects to display only active created links, the list of created links may be filtered to only include links whose status is listed as active. Just as explained above with respect to the link type 220, the list of created links can be filtered based on the search 215 results, the link type 220, and the link status 230.

The dashboard 200 may further include a link expiration date 235. As explained above, with respect to FIG. 1B, when a link is created, the creating public safety agency user may specify an expiration date for the link. Once the expiration date has passed, any person attempting to use the link to upload media will be unable to do so. A notification may be sent to a public safety agency user (e.g. the person who created the link, a person designated to handle media upload requests to expired links, etc.) to inform them that someone is attempting to upload media to an expired link and that follow up action may be necessary. A further description of an expired link and additional processing that may occur on an expired link is described in further detail below.

Although not shown in FIG. 2, the link status 230 and/or expiration date 235 fields may be fields that can be edited via the dashboard 200. Thus, if there is an active link, with no expiration date or an expiration date in the future, the user could, from the dashboard 200, alter the expiration date to cause the link to expire immediately. Likewise, if a link has already expired, the user could revive the link by changing the expiration date to a date in the future. The user could also shorten or lengthen the expiration date of an active link directly from the dashboard.

A created link 240 from the list of created links on the dashboard 200 may be selected. For example, the specific created link in the list of created links may be selected by performing a single click on an element of the list of created links. This may bring up the option to share 245 the link with others. As explained with respect to FIGS. 1C and 1D, the user is given the option to share the link at the time of link creation. At some later point in time, it may be desired to share the link with additional people. By selecting the option to share the link with additional people, the public safety agency user may be presented with pop up screens similar to those described with respect to FIGS. 1C and 1D.

The dashboard 200 may also include an option to delete 250 a created link. The result of deleting a created link may cause the created link to be removed from the dashboard. However, because the techniques described herein are utilized in a public safety environment which may include strict auditing and chain of custody requirements, a deleted link may not actually be deleted, but rather is simply hidden from the dashboard. In some implementations, links that are expired may periodically be removed from the dashboard, such that the dashboard does not become cluttered with expired links. It should be noted that in either case, deleted or expired created links, the created links and their dashboard entries still exist, but are simply suppressed from being displayed on the dashboard.

Figure 3:
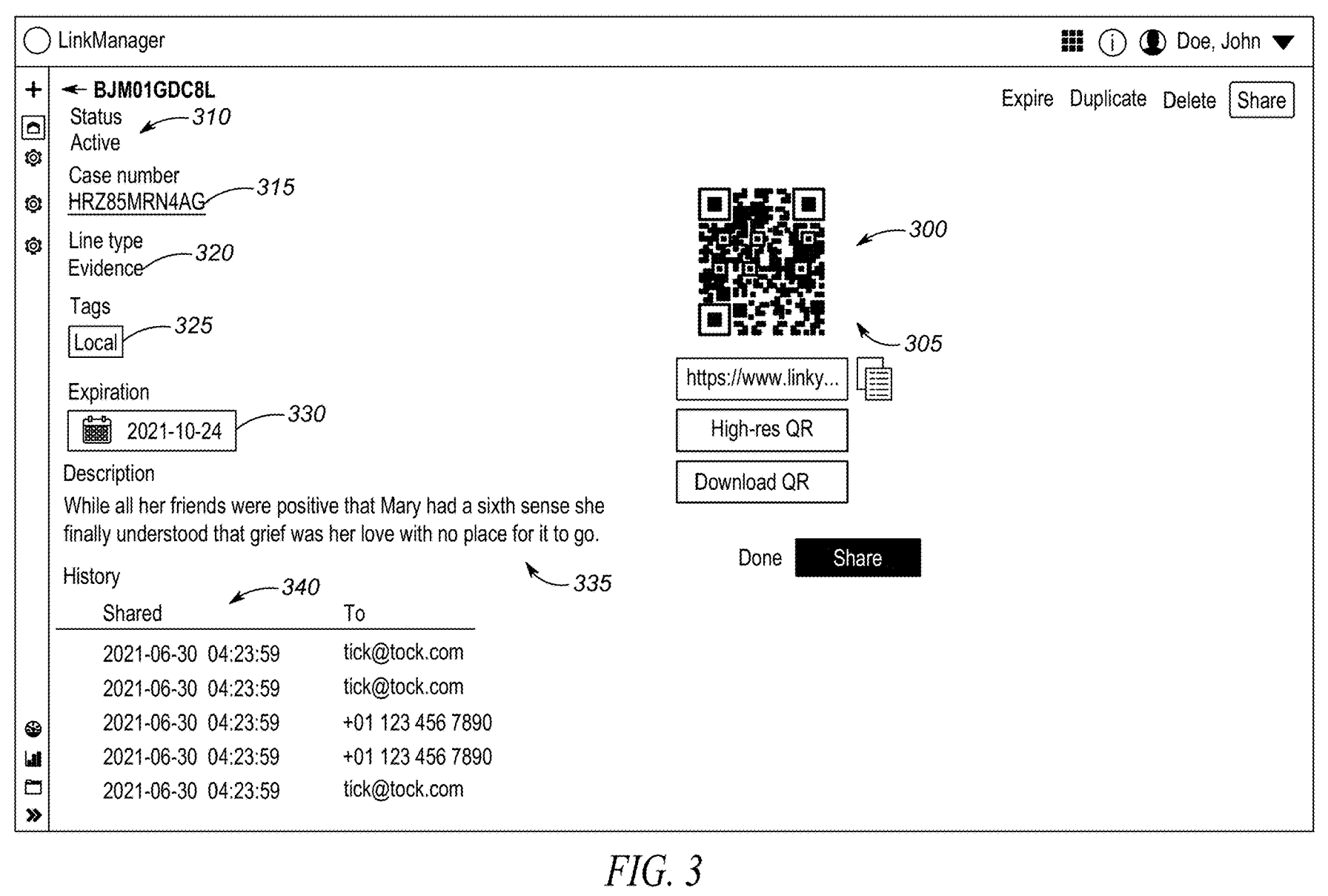

FIG. 3 is an example of a created link details page 300. For example, the user interface screen 300 may be presented upon selection (e.g. double click, etc.) of a particular list element of the list of created links described with respect to dashboard 200. The user may select a particular created list in order to get details about the created link.

The link details page 300 may include the created link itself 305 (e.g. the QR code representing the link, the URL version of the link, etc.). The link details page may also provide the user with the option to download the link for later distribution to others. The link details page may also include information that was available from the dashboard 200 or from when the link was created. For example, the link details page may include if the link is active or expired 310, the case number associated with the link 315, and the link type 320.

The link details page 300 may also include any tags 325 that were associated with the link. This information may have been entered when the link was created, such as described with respect to FIG. 1. In some implementations, this information related to the link may be modified via the link detail page. However, in other implementations, such modifications may be disallowed, or only allowed by persons with sufficient privileges, in order to avoid any questions about the propriety of modifying already created links.

The link details page 300 may also include an expiration date 330 that may be modified. When a link is created, an expiration date may be specified. The reason for this is that in some cases, media received via the link is only valuable when it is submitted within a specified period of time. For example, in the case of an event such as a mass shooting, the link may be created and sent to the public at large, instead of any specific recipients. For example, the link may be created and included in a social media post from the public safety agency (e.g. "We are looking for any cellphone video from the recent bank robbery. Please click the link to upload.").

It may be desired to set an expiration date for such a link that can be changed. Initially, the link may be set to a short period of time (e.g. 2 weeks, etc.) because video received after that period of time may generally prove to be not useful/unreliable. In some cases, in particular with links that are generated for distribution to the public at large, the public safety agency may be inundated with media uploads from non-serious submitters (e.g. people wishing to create difficulties for the public safety agency, mentally unstable people, etc.). In some cases, there may even be organized efforts by the public to inundate the public safety agency with media in order to make their job more difficult. In such cases, the link may be set to expire immediately, thus preventing further upload of media for a period of time.

It should be understood that any attempt to use an expired link in order to upload media may be monitored. In some cases, it may be monitored by the individual that created the link, while in other cases it may be monitored by others (e.g. cold case file group, etc.). For example, consider a case where someone uses a long ago expired link (e.g. expired over a year ago, etc.) to attempt to upload media. In such a case, the public safety agency personnel monitoring the attempt may wish to follow up directly with the person attempting to upload media. For example, the person may have had the media but was scared to upload it during the time the link was active (e.g. fear of the publicity, fear of retribution, etc.).

In such a case, the media upload page may indicate to the person attempting to use the link that the link has expired. The person may be prompted to enter information (e.g. name, address, phone number, etc.) that may be used by the public safety agency in order to contact the person to understand why they were attempting to use an expired link. In other cases, certain identifying information about the attempt to use the link (e.g. originating IP address, etc.) may be captured. Through the use of normal legal proceedings, the identity of such persons attempting to use the link may be determined, in some cases.

If the link had been set to expire because the public safety agency was being overwhelmed with fraudulent media uploads, once that condition has subsided (e.g. the public has moved on to the next incident, etc.), the link may then be set to become active again by changing the expiration date.

The link details page 300 may also include the description 335 of the created link. For example, the description may be that which was entered as described above with respect to FIG. 1B. In some implementations, the description may be editable from the link details page, while in other implementations, the description may be a read only field, thus ensuring there is no change in the description from the time the link was created.

The link details page 300 may also include a history 340 section, which lists all of the people to whom the link was sent as well as the date the link was sent. Understanding who the link was sent to may aid in determining the validity/trustworthiness of any media uploaded using the link. For example, in the casino use case described above, the link may have been sent to professional casino security staff that are being compelled to produce media in accordance with a lawful subpoena. In such a case, it is more likely that the media that has been uploaded is trustworthy.

This is in contrast to a request that has been sent to the public at large (e.g. via a social media post, newspaper article, etc.) in which case there can be no assumptions about the validity/trustworthiness of the uploaded media because the link was sent to an entirely un-vetted group of people. The trustworthiness may lie somewhere in between as well. For example, in the case of a witness uploading media, the particular involvement of the witness in the incident may not be known. At the time of link creation, it may not be possible to determine if the witness is just a witness, a victim, or even a perpetrator. The level of trust may be greater than that of a link sent to the public at large, but not as great as someone, such as the casino security staff, that has been vetted by virtue of their role.

Although not shown, the link detail page 300 may also include an indication of which people to whom the link has been shared have actually uploaded media. This can be useful in a case where it is expected to receive media from everyone to whom the link was sent. The link details page can be used to determine once all those persons have submitted media.

Also not shown is that the link details page 300 may also include a link to the actual media files that have been uploaded. As mentioned above, the media upload page that is presented when a link is activated may come from a DEMS system. The link details page may include a list of all media uploaded, when the media was uploaded, and who uploaded the media. In some cases, the listed media files may be clicked on from the link details page itself. In some implementations, this may cause the media to play in a media player embedded in the link details page (not shown). In other implementations, clicking the media file may cause an external player to launch or may direct the user to the DEMS system to retrieve the media file from there.

Also not shown is that the link details page may include a category associated with the link. The category may include the level of trust of the people with whom the link is shared. The more trustworthy the people to whom the link is shared are, the more trustworthy any media uploaded via the link likely is. Likewise, the less trustworthy the people sent the link, including to the public at large, the less trustworthy any media uploaded via the link might be. The link category lets the public safety agency user know how much trust should be placed in any media uploaded via the link.

FIG. 4 is an example of a high level flow diagram 400 for management of links related to public safety incidents within a window displayed in a graphical user interface. In block 405 creation of a plurality of links associated with public safety incidents may be monitored. Each link of the plurality of links may be associated with a media upload page. Activation of the link may direct the user to the media upload page associated with the link in order to upload media related to the public safety incident. For example, a public safety agency user may wish to request media upload from one or more people. A link is created that when activated directs the user to a media upload page that may be provided by a DEMS system to upload media and maintain association of that uploaded media with the link.

In block 410 sharing of when each link is shared is monitored. Until a link is shared, it is not expected that any media will be uploaded using the link. Monitoring when the link is shared allows for display of the sharing time on the graphical user interface. In block 415, with whom the link is shared may be monitored. As explained above, the trustworthiness of any media uploaded via the link may be dependent on who is uploading the media. Monitoring who the link is shared with, and thus who will be uploading media, can help in determining how trustworthy the uploaded media is. Furthermore, monitoring who the link is shared with can be used to determine who has uploaded media (e.g. to determine when every who has been requested to upload media has completed the task, etc.).

In block 420, a list of created links may be displayed on the graphical user interface. The links may have been created by an agency and the list of created links is a singular list that stores all links that have been created by the agency. The list of created links including an identifier for each created link, a description of each created link, a status of each created link, and an expiration date of each created link. By maintaining a singular list, the agency is able to keep track of all links that have been created. This prevents individual users from creating links independently without the agency being aware that a link was created. Each link may include an identifier, such as a case number or incident identifier, that may be used to associate the link with a particular public safety agency matter.

Each created link may also include a description which allows the public safety agency user to understand why the link was created. Each link may also include a status identifier indicating if the link is currently active or expired. Each created link may also include an expiration date which allows the public safety agency user to know when the link is going to expire. As explained above, when an expired link is activated, the person who activated the link is no longer allowed to upload media. In addition, a specified user may be notified of the attempt to upload media using an expired link. That specified person may take further action, including following up with directly with the person attempting to use the expired link.

In block 425, user input selecting a created link from the list of created links may be received. In other words, the user is viewing a list of all links that have been created, and may wish to obtain more detailed information about one of the created links. The user may select one the created links from the list of created links to get those additional details.

In block 430, details about the link creation may be displayed on the graphical user interface. The details may include when the link that was created, the expiration date of the link, whom the link was shared with, and when the link was shared. In other words, the information that was provided at the time the link was created may be presented to the user, in order for the user to understand the circumstances under which the link was created.

In block 435, a control to alter the expiration date of the link may be provided on the graphical user interface. A notification of media upload using the link is routed based, in part, on the expiration status of the link. As explained above, there are multiple reasons why the expiration date of a link may be changed. A control (e.g. a text box, toggle field, drop down box, calendar control, etc.) may be provided in order to allow the public safety agency user to alter the expiration date of the link from either the list of created links or the details of the created links displayed on the graphical user interface. The expiration date of the link may determine how notifications for media upload are routed. For example, in some implementations, media is not allowed to be uploaded for expired links. Instead, the upload attempt is routed to a designated person for additional processing (e.g. direct follow up with the person attempting to use the link, etc.).

In block 440, a media link may be associated with the created link and displayed on the graphical user interface. Activation of the media link may cause the graphical user interface to display a list of media that was uploaded using the link. In other words, upon activation of the media link (e.g. a user interface button, etc.) may cause a list of all media that has been uploaded using the link to be displayed. In some implementations, the media will have been uploaded to a DEMS system, and the list of media is provided by that system.

In block 445, an embedded media player may be provided via the graphical user interface. The embedded media player may be used to play the media that was uploaded via the link. The media may have been stored in a DEMS system. In other words, the user may be able to see what media has already been uploaded via the link, as well as play the media directly from the graphical user interface by selecting a piece of uploaded media. The media itself may be stored in a secure DEMS system In block 450, a history of access to the created links may be monitored. The history may indicate who has attempted to access the created links (e.g. attempted to upload media, etc.) and if any media was actually uploaded via the link. This allows the user to see if all expected media uploads have occurred (e.g. based on who the links was shared with, etc.) and if not, see who has yet to upload expected media. The monitoring is also used to detect if anyone has attempted to use an expired ink to upload media. In block 455, the history of access may be displayed via the graphical user interface.

FIG. 5 is an example of a high level flow diagram 500 for the process of link creation. In block 505, a link creation control may be provided within the graphical user interface. For example, the link creation control may be a button on the graphical user interface that initiates the process of link creation, as described with respect to FIGS. 1(A-D). Although a clickable button is an example of a control that may be used to initiate link creation, it should be understood that the techniques described herein are not so limited. Other examples, may include radio button controls, drop down box controls, context sensitive (e.g. right click, etc.) controls, or any other type of control that can be selected and would be known to a person of skill in the art of user interface design.

In block 510, in response to activation of the link creation control to create a link, at least one pop-up window may be provided. Through the pop-up window, the user may provide information that may be used in creating the link. For example, the user may provide at least one of a case identifier 515 and a link type 520. The case identifier may be used to identify an incident or other case within the public safety agency for which the link is being created. The link type may include what type of information or media is expected to be submitted via the link (e.g. digital evidence, witness statements, etc.).

In block 525, the link may be created. As explained above, the link may be a visual link such as a QR code that can be scanned by a device such as a smart phone. The link may also be a link such as a URL that may be accessed via a software application such as a web browser. Regardless of form, the created link, when activated, may direct the person activating the link to a media upload page, in order to upload media.

In block 530, the created link may be added to the list of created links. By including the link on the list of created links, the public safety agency user is able to select the created link from the list of created links to obtain information about the created link.

In block 535, an identification of a designated user to be notified when media is uploaded using a link whose status is expired may be received via the graphical user interface. As explained above, links may expire based on a date specified by a public safety agency user. For example, the creator of the link may specify when the link is to expire. If an attempt is made to upload media using an expired link, the identified designated user may be notified in order to follow up with the person attempting to utilize the expired link to gain further information as to why the user is using an expired link.

In block 540, each created link may be associated with a category vi the graphical user interface. The category associated with a link may be indicative of a level of trust of media uploaded using the created link. As explained above, the particular people that receive the link may determine the trustworthiness of the uploaded media. Links sent to specific, trustworthy individuals may be associated with trustworthy uploaded media, while links sent to less trustworthy individuals, or even the public at large, may be associated with less trustworthy uploaded media.

Figure 6:
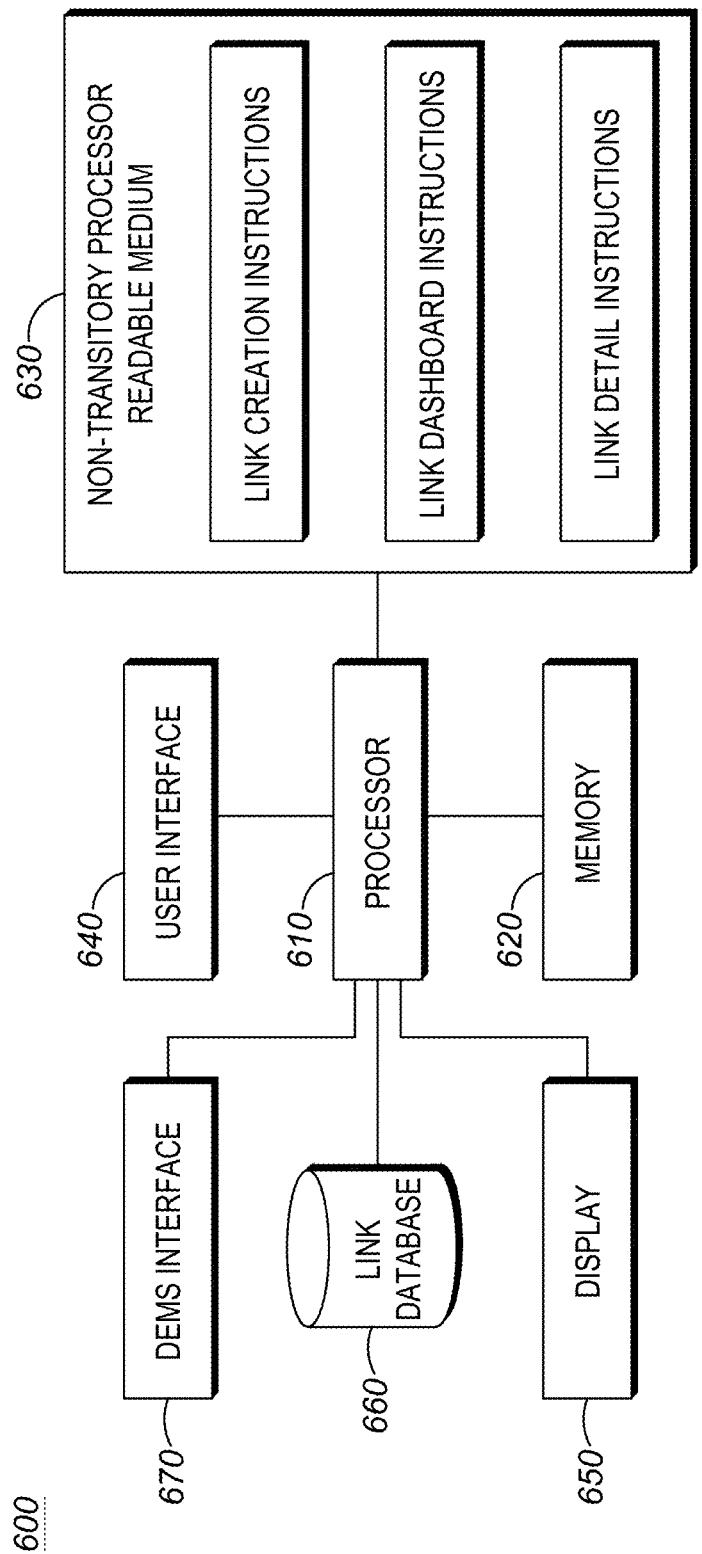
FIG. 6 is an example of a device that may implement the creation and management of public links in a public link dashboard for public safety agencies techniques described herein.

FIG. 6 is an example of a device 600 that may implement the creation and management of public links in a public link dashboard for public safety agencies techniques described herein. It should be understood that FIG. 6 represents one example implementation of a computing device that utilizes the techniques described herein. Although only a single processor is shown, it would be readily understood that a person of skill in the art would recognize that distributed implementations are also possible. For example, the various pieces of functionality described above (e.g. link creation, link dashboard, link details, etc.) could be implemented on multiple devices that are communicatively coupled. FIG. 6 is not intended to imply that all the functionality described above must be implemented on a single device.

Device 600 may include processor 610, memory 620, non-transitory processor readable medium 630, user interface 640, display 650, link data base 660, and DEMS interface 670.

Processor 610 may be coupled to memory 620. Memory 620 may store a set of instructions that when executed by processor 610 cause processor 610 to implement the techniques described herein. Processor 610 may cause memory 620 to load a set of processor executable instructions from non-transitory processor readable medium 630. Non-transitory processor readable medium 630 may contain a set of instructions thereon that when executed by processor 610 cause the processor to implement the various techniques described herein.

For example, medium 630 may include link creation instructions 631. The link creation instructions 631 may cause the processor to provide a user interface in order to create links. For example, the link creation instructions may take input from user interface 640 to receive input from the user that it is desired to create a link to be used for uploading media. The user interface may include devices, such as a keyboard and/or mouse that allows the user to input data directly into device 600.

It should also be understood that the user interface may include an interface that allows the user to enter data from a remote location. For example, the user interface may be an API that may be used by an application installed on the user's own device (e.g. laptop computer, smartphone, etc.) that allows interaction with device 600. In other implementations, the user interface may be a web based interface that allows any user with access to a web browser (and proper login credentials) to access device 600. Regardless of form, it should be understood that user interface 640 allows user to enter information needed for link creation.

The link creation instructions 631 may cause the processor to receive information from the user (e.g. case identifier, link type, etc.) from the user that will be used to create the link. The link creation instructions may also cause the link creation information to be stored in a link database 660 that may be used to identify and display all created links. The link creation instructions may further interface with a DEMS system via DEMS interface 670 to notify the DEMS system that a link is being created, and that the DEMS system should prepare a media upload landing page associated with the link.

The link creation instructions 631 may also cause the results of the link creation to appear on the display 650. Display 650 may be a device, such as a monitor, that is coupled to device 600 and allows for visual representation of the output of device 600. It should be understood that display 650 may also be remote from device 600. For example, the physical display that is used by a user may be a display screen on a remote device (e.g. laptop, smartphone, etc.). The link creation instructions 631 are described generally throughout the specification, including places such as FIGS. 1(A-D), and blocks 505-540.

The medium 630 may include link dashboard instructions 632. The link dashboard instructions may allow device 600 to retrieve all created links from link database 660 or the DEMS system and display those links in a dashboard format via the display 650. The dashboard may include high level details about each link, including if the link is active and when the link is set to expire. The link dashboard instructions may allow the user to alter the expiration data information via input from the user interface 640, described above. The link dashboard instructions may also allow the user to select, via the user interface 640, a specific item in the list of created links for which further detail is described. The link dashboard instructions are described generally throughout the specification, including places such as FIG. 2 and blocks 405-420 and 435.

The medium 630 may include link detail instructions 633. The link detail instructions 633 may allow device to receive a selection from the user via the user interface 640 of a specific list item on the link dashboard and display further details related to the link. The link detail instructions 633 may cause the device to display specific information about the selected created link, such as when the link was created, a description of the link, and expiration date of the link, an access history of the link, a media link that allows access to media uploaded via the link, etc. via the display 650. The link detail instructions 633 may also provide the ability of the user to change the link expiration date via the user interface 640. The link detail instructions 633 are described generally throughout the specification, including places such as FIG. 3 and blocks 425, 430, and 440-455.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot provide a graphical user interface that includes the ability to select items on the graphical user interface to display details about those items or take other actions based on the selection, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A computer-implemented method for management of links related to public safety incidents within a window displayed in a graphical user interface, the method comprising:

monitoring creation of a plurality of links associated with public safety incidents, each link of the plurality of links associated with a media upload page, wherein activation of the link directs a user to the media upload page associated with the link in order to upload media related to the public safety incident;

monitoring when each of the links is shared;

monitoring with whom each of the links is shared;

displaying, on the graphical user interface, a list of the created links, the links created by an agency, wherein the list of created links is a singular list that stores all links that have been created by the agency, the list of created links including an identifier for each created link, a description of each created link, a status of each created link, and an expiration date of each created link;

receiving, via the graphical user interface, user input selecting a created link from the list of created links;

displaying, on the graphical user interface, details about the link creation, the details including when the link that was created, the expiration date of the link, whom the link was shared with, and when the link was shared; and providing, on the graphical user interface, a control to alter the expiration date of the link, wherein a notification of media upload using the link is routed based, in part, on the expiration date of the link.

2. The computer-implemented method of claim 1 further comprising:

providing a link creation control within the graphical user interface;

in response to activation of the link creation control to create a link, providing at least one pop-up window wherein the user inputs at least one of:

a case identifier; and a link type;

creating the link; and adding the created link to the list of created links.

3. The computer-implemented method of claim 1 further comprising:

displaying, on the graphical user interface, a media link associated with the created link, wherein activation of the media link causes the graphical user interface to display a list of media that was uploaded using the link.

4. The computer-implemented method of claim 3 further comprising:
providing, via the graphical user interface, an embedded media player that is able to play the media that was uploaded via the link, wherein the media is stored in a digital evidence management system (DEMS).

5. The computer-implemented method of claim 1 further comprising:
receiving, via the graphical user interface, an identification of designated user to be notified when media is uploaded using a link whose status is expired.

6. The computer-implemented method of claim 1 further comprising:
associating, via the graphical user interface, a category with each created link, wherein the category associated with a link is indicative of a level of trust of media uploaded using the created link.

7. The computer-implemented method of claim 1 further comprising:
monitoring a history of access to the created links, the history indicating who has attempted to access the created links and if any media was uploaded via the link; and
displaying, via the graphical user interface, the history of access.

8. A computing device to implement management of links related to public safety incidents within a window displayed in a graphical user interface, the device comprising:
a processor; and
a memory coupled to the processor, the memory containing a set of instructions thereon that when executed by the processor cause the processor to:
monitor creation of a plurality of links associated with public safety incidents, each link of the plurality of links associated with a media upload page, wherein activation of the link directs a user to the media upload page associated with the link in order to upload media related to the public safety incident;
monitor when each of the links is shared;
monitor with whom each of the links is shared;
display, on the graphical user interface, a list of the created links, the links created by an agency, wherein the list of created links is a singular list that stores all links that have been created by the agency, the list of created links including an identifier for each created link, a description of each created link, a status of each created link, and an expiration date of each created link;
receive, via the graphical user interface, user input selecting a created link from the list of created links;
display, on the graphical user interface, details about the link creation, the details including when the link that was created, the expiration date of the link, whom the link was shared with, and when the link was shared; and
provide, on the graphical user interface, a control to alter the expiration date of the link, wherein a notification of media upload using the link is routed based, in part, on the expiration date of the link.

9. The device of claim 8 further comprising instructions to:
provide a link creation control within the graphical user interface;
in response to activation of the link creation control to create a link, provide at least one pop-up window wherein the user inputs at least one of:
a case identifier; and
a link type;
create the link; and
add the created link to the list of created links.

10. The device of claim 8 further comprising instructions to:
display, on the graphical user interface, a media link associated with the created link, wherein activation of the media link causes the graphical user interface to display a list of media that was uploaded using the link.

11. The device of claim 8 further comprising instructions to:
provide, via the graphical user interface, an embedded media player that is able to play the media that was uploaded via the link, wherein the media is stored in a digital evidence management system (DEMS).

12. The device of claim 8 further comprising instructions to:
receive, via the graphical user interface, an identification of designated user to be notified when media is uploaded using a link whose status is expired.

13. The device of claim 8 further comprising instructions to:
associate, via the graphical user interface, a category with each created link, wherein the category associated with a link is indicative of a level of trust of media uploaded using the created link.

14. The device of claim 8 further comprising instructions to:
monitor a history of access to the created links, the history indicating who has attempted to access the created links and if any media was uploaded via the link; and
display, via the graphical user interface, the history of access.

15. A non-transitory processor readable medium containing a set of instructions thereon that when executed by a processor cause the processor to implement management of links related to public safety incidents within a window displayed in a graphical user interface, the medium comprising instructions that cause the processor to:
monitor creation of a plurality of links associated with public safety incidents, each link of the plurality of links associated with a media upload page, wherein activation of the link directs a user to the media upload page associated with the link in order to upload media related to the public safety incident;
monitor when each of the links is shared;
monitor with whom each of the links is shared;
display, on the graphical user interface, a list of the created links, the links created by an agency, wherein the list of created links is a singular list that stores all links that have been created by the agency, the list of created links including an identifier for each created link, a description of each created link, a status of each created link, and an expiration date of each created link;
receive, via the graphical user interface, user input selecting a created link from the list of created links;
display, on the graphical user interface, details about the link creation, the details including when the link that was created, the expiration date of the link, whom the link was shared with, and when the link was shared; and
provide, on the graphical user interface, a control to alter the expiration date of the link, wherein a notification of media upload using the link is routed based, in part, on the expiration date of the link.

16. The medium of claim 15 further comprising instructions to:
provide a link creation control within the graphical user interface;
in response to activation of the link creation control to create a link, provide at least one pop-up window wherein the user inputs at least one of:
a case identifier; and
a link type;
create the link; and
add the created link to the list of created links.

17. The medium of claim 15 further comprising instructions to:
display, on the graphical user interface, a media link associated with the created link, wherein activation of the media link causes the graphical user interface to display a list of media that was uploaded using the link.

18. The medium of claim 15 further comprising instructions to:
receive, via the graphical user interface, an identification of designated user to be notified when media is uploaded using a link whose status is expired.

19. The medium of claim 15 further comprising instructions to:
associate, via the graphical user interface, a category with each created link, wherein the category associated with a link is indicative of a level of trust of media uploaded using the created link.

20. The medium of claim 15 further comprising instructions to:
monitor a history of access to the created links, the history indicating who has attempted to access the created links and if any media was uploaded via the link; and
display, via the graphical user interface, the history of access.

* * * * *